No. 769,565. PATENTED SEPT. 6, 1904.
R. LE B. OWEN & R. O. LE BARON.
COMPRESSED AIR SUPPLY FOR ELECTRIC VEHICLES.
APPLICATION FILED SEPT. 30, 1903.
NO MODEL.
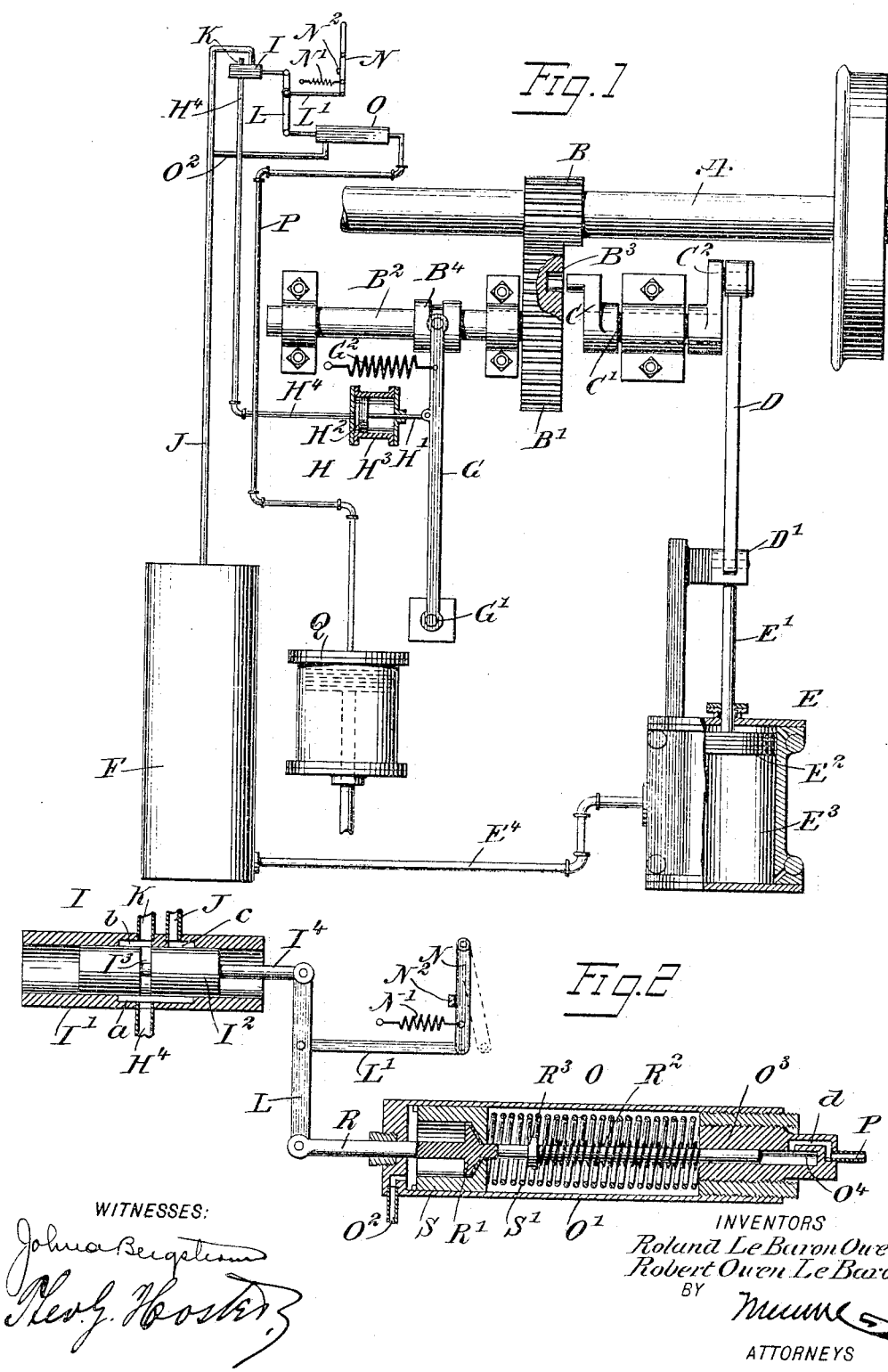
WITNESSES:
INVENTORS
Roland Le Baron Owen
Robert Owen Le Baron
BY
ATTORNEYS No. 769,565.                                                                 Patented September 6, 1904.

UNITED STATES PATENT OFFICE.

ROLAND LE BARON OWEN AND ROBERT OWEN LE BARON, OF PONTIAC, MICHIGAN.

COMPRESSED-AIR SUPPLY FOR ELECTRIC VEHICLES.

SPECIFICATION forming part of Letters Patent No. 769,565, dated September 6, 1904.

Application filed September 30, 1903. Serial No. 175,175. (No model.)

*To all whom it may concern:*

Be it known that we, ROLAND LE BARON OWEN and ROBERT OWEN LE BARON, both citizens of the United States, and residents of Pontiac, in the county of Oakland and State of Michigan, have invented a new and Improved Compressed-Air Supply for Electric Vehicles, of which the following is a full, clear, and exact description.

The invention relates to fluid-pressure brakes used on electric street-cars and other vehicles; and its object is to provide a new and improved device for automatically supplying the compressed air required for working the fluid-pressure brakes, the device being actuated during the time the electric power is shut off in stopping the vehicle, thus utilizing the power which ordinarily is wasted.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1 is a plan view of the improvement, parts being in section; and Fig. 2 is an enlarged sectional plan view of the controlling-valve and of the automatic controller.

On one of the axles A of an electric street-car or other vehicle is secured a pinion B in mesh with a gear-wheel B', secured on a shaft $B^2$, mounted to turn and to slide transversely in suitable bearings attached to the vehicle. On one face of the gear-wheel B' is arranged a clutch member $B^3$, adapted to engage a clutch member C, held on a shaft C', likewise journaled in suitable bearings on the vehicle, and on the said shaft is secured a crank-arm $C^2$, connected by a pitman D with a cross-head D', held on the piston-rod E' of a piston $E^2$, moving in a cylinder $E^3$, forming part of an air-pump E of any approved construction and connected by a pipe $E^4$ with a compressed-air-storage tank F, carried by the vehicle. The air-pump E is inactive during the running of the car except when the car is about to be stopped and the power is shut off, and then the shaft $B^2$ is caused to slide from the left to the right, so that the clutch member $B^3$ engages the clutch member C to rotate the shaft C' from the shaft $B^2$, driven by the axle A during the time the power is shut off and the car comes to a stop. When the shaft C' is rotated, the pump is actuated by the connection described, so that air is pumped by way of the pipe $E^4$ into the tank F to keep the pressure therein at or slightly above a normal working pressure for the air-brakes. When the current is turned on again for starting and running the car, the shaft $B^2$ is shifted back to its former position, so as to disconnect the clutch member $B^3$ from the clutch member C to stop the air-pump E.

In order to impart the desired motion to the shaft $B^2$, as above described, the following arrangement is provided—that is: A fluid-controlled mechanism H is employed for shifting the shaft $B^2$ from the left to the right to connect the clutch members $B^3$ and C with each other, and the fluid-pressure required for this mechanism H is derived from the tank F and is controlled by a controlling-valve I. On the shaft $B^2$ is secured a shifting-collar $B^4$, engaged by a shifting-lever G, fulcrumed at G' and pressed on by a spring $G^2$ to normally hold the shaft $B^2$ in such position that the clutch member $B^3$ is out of engagement with the clutch member C, as shown in Fig. 1. The shifting-lever G is connected with the piston-rod H' of a piston $H^2$, mounted to slide in a cylinder $H^3$, forming part of the fluid-controlled mechanism H and connected by a pipe $H^4$ with the casing I' of the controlling-valve I, which in turn is connected by a pipe J with the tank F. In the valve-casing I' is mounted to slide a cylindrical valve $I^2$, having an annular groove $I^3$ for connecting a channel *a* at the pipe $H^4$ with a channel *b*, leading to a pipe K, opening into the atmosphere. The annular groove $I^3$ is also adapted to connect the channel *a* with a channel *c*, leading to the pipe J, so that when the pipe J is connected with the pipe $H^4$ by way of the channels *c* and *a* and the groove $I^3$, then compressed air passes from the tank F by way of the pipe $H^4$ into the cylinder H³ to act on the piston H² therein to impart a swinging motion to the shifting-lever G for shifting the shaft B² from the left to the right to connect the clutch member B³ with the clutch member C to actuate the air-pump E. When the valve I² is moved back to the position shown in Fig. 2—that is, disconnecting the pipes J and H⁴ and connecting the pipe H⁴ with the pipe K—then the air from the cylinder H³ can escape, and the piston H² is now free to move back in the cylinder H³ to allow a return movement of the shaft B² by the action of the spring G² on the shifting-lever G. When this takes place, the clutch member B³ is disconnected from the clutch member C to stop the air-pump E. The valve I² is controlled by a rheostat-lever under the control of the motorman in charge of the electric car, and for this purpose the valve I² has its valve-stem I⁴ connected with a lever L, connected by a link L' with a pivoted arm N, moving with the rheostat-lever after the current is shut off and the rheostat-lever is moved farther back a short distance. The arm N is pressed on by a spring N' to hold the arm normally against a stop N² to retain the valve I² normally in the position shown in Fig. 2—that is, to connect the pipes H⁴ and K with each other. When the rheostat-lever is moved by the motorman to shut off the current and moved somewhat beyond this position, then a swinging motion is given to the arm N to move the latter to the position shown in dotted lines in Fig. 2, whereby the link L', acting on the lever L, causes the valve I² to be moved to the right to connect the channels c and a with each other by the annular groove I³, so that air passes into the cylinder H³, as previously explained, to shift the shaft B² and to start the pump E during the time the power is shut off from the motor of the car and until the car comes to a standstill. When the motorman throws the rheostat-lever in the opposite direction and turns on the current, then the arm N is pulled back to its former position by the action of the spring N', so that the valve I² is returned to its normal position—that is, the pipes J and H⁴ are disconnected and the pipe H⁴ is connected with the pipe K to allow the air to exhaust from the cylinder H³. The spring G² now moves the shaft B² back to its normal position to disconnect the clutch members B³ and C.

In order to automatically start the air-pump E in case the pressure in the tank F falls below a normal predetermined pressure, an automatic controller O is provided, arranged as follows: The casing O' of the controller is connected at one end by a pipe O² with the pipe J, leading from the tank F, and in the other end of the casing O' is arranged a plug O³, connected by a pipe P with the brake-cylinder Q of the usual fluid-pressure brake of the vehicle. A piston-rod R is mounted to slide in the casing O', and plug O³ and is connected at its outer end with the lever L, for which the piston-rod R normally forms the fulcrum when working the arm N, as previously described, and on the said piston-rod R is secured a piston R', mounted to slide in and normally seated on one end of a spring-pressed piston S, fitted to slide in the casing O' against a spring S', adjacent to the end into which leads the pipe O². A spring R² is coiled on the piston-rod R and rests with one end on the plug O³ and at the other end on a collar R³, secured to the said piston-rod, so that when the pressure in the tank F falls below a normal pressure then this spring R² imparts a sliding motion to the piston-rod R from the right to the left to give a swinging motion to the lever L, the link L' of which then acting as a fulcrum for the said lever. The movement of the lever on the outward movement of the piston-rod R causes a shifting of the valve I² to connect the pipes J and H⁴ with each other, so that the fluid-controlled mechanism H is actuated to throw the pump E into gear to actuate the same for pumping compressed air into the tank F until the desired pressure is reached. When this takes place, then the pressure from the tank F, passing by way of the pipes J and O² into the left end of the casing O', exerts sufficient pressure on the piston R' to overcome the force of the spring R², so that the piston R' and its piston-rod R are moved back to their normal positions, thus shifting the valve I² back to its normal position, as shown in Fig. 2, to allow air to exhaust from the cylinder H³. In case the pressure in the tank F rises above a normal predetermined pressure then the pressure from the tank exerted against the pistons S and R' causes the same to move simultaneously from the left to the right against the tensions of the springs R² and S', so that the valve I² is shifted to move the latter to its normal position, thereby bringing the pump E to a stop without requiring any attention on the part of the motorman, and a subsequent moving of the arm N by the motorman does not throw the air-pump into action until the pressure in the tank F has been reduced to normal pressure.

In the plug O³ is formed a chamber O⁴, connected by a port d with the pipe P, previously mentioned, and the inner end of the said port d is adapted to be closed by the inner end of the piston-rod R at the time the pistons R' and S are moved to the right under high pressure from the tank F. As the chamber O⁴ is normally connected by the port d with the pipe P, leading to the brake-cylinder Q, it is evident that when the brakes are put on and the air-pressure in the tank F is but little below the normal pressure then the valve I² is shifted to bring the air-pump E into action for raising the pressure in the tank F to normal pressure.

From the foregoing it will be seen that the pressure in the tank F is always maintained above the minimum, and when the pressure is above the maximum the air-pump E does not act unless the air-pump was acting previous to the rising of the pressure above the maximum, and if the motorman has neglected to set the air-pump into action it is always thrown into action when the brakes are applied unless the pressure remains nearly up to the maximum after the brakes have been applied.

By reference to Fig. 2 it will be seen that the efficient area of the piston R' equals that of the piston S, and the area of the piston-rod R in the chamber $O^4$ equals about one-fifth of that of the piston R' or S and is intended to act at forty and fifty pounds pressure. Suppose the minimum pressure is forty pounds, the maximum fifty pounds, and the effective area of the piston R' or S is one-half a square inch and the spring S' is set to thirty pounds and the spring $R^2$ to twenty pounds. Then if the pressure in the tank ever falls below forty pounds the air-pump is thrown in, and if the pressure rises above fifty pounds it is thrown out, and the motorman cannot throw the air-pump into action. If the motorman throws on the brakes without having imparted a swinging motion to the arm N, then the air-pump is thrown into action if the pressure is below fifty pounds in the tank F. If the pump is working and the brakes are applied, then the pressure can rise, say, to about fifty-six pounds in the tank F, and on a further rise the air-pump is thrown out of action.

Having thus described our invention, we claim as new and desire to secure by Letters Patent—

1. A compressed-air supply for electric cars, having a compressed-air tank, an air-pump, a gearing for actuating the pump from a movable part of the car, and a fluid-controlled mechanism, controlled by the operating-lever of the electric car and connected with the gearing, to throw the latter in or out of gear by fluid-pressure from the said tank, as set forth.

2. A compressed-air supply for electric cars, having a compressed-air reservoir, an air-compressor, a fluid-controlled means connected with the air-reservoir for throwing the compressor in and out of action, and a valve connected with the air-reservoir and controlled by the operating-lever of the car.

3. A compressed-air supply for electric cars, having a compressed-air reservoir, an air-compressor, a fluid-controlled means having connection with the air-reservoir for throwing the compressor in and out of action, a valve in the said connection, and means for operating the valve from the operating-lever of the car.

4. A compressed-air supply for electric cars, having a compressed-air tank, an air-pump, a gearing for actuating the pump from a movable part of the car, a brake-cylinder, and a fluid-controlled mechanism controlled by minimum fluid-pressure in the said brake-cylinder, for throwing the said gearing into gear, as set forth.

5. A compressed-air supply for electric cars, comprising a compressed-air tank, an air-pump for supplying the tank with compressed air, driving means for operating the pump from a movable part of the car, a fluid-controlled mechanism having connection with the said tank, for throwing the said driving means in and out of gear, and a valve in the said connection, controlled by the operating-lever of the vehicle, as set forth.

6. A compressed-air supply for electric cars, comprising a compressed-air tank, an air-pump for supplying the tank with compressed air, driving means for operating the pump from a movable part of the car, a fluid-controlled mechanism having connection with the said tank, for throwing the said driving means in and out of gear, a valve in the said connection, controlled by the operating-lever of the vehicle, and an automatic controller connected with the said valve, as set forth.

7. A compressed-air supply for electric cars, comprising a compressed-air tank, an air-pump for supplying the tank with compressed air, driving means for operating the pump from a movable part of the car, a fluid-controlled mechanism having connection with the said tank, for throwing the driving means in and out of gear, a valve in the said connection, controlled by the operating-lever of the vehicle, and an automatic controller connected with the said valve, the said automatic controller comprising a casing and two spring-pressed pistons movable therein, one of the pistons being connected with the valve and the casing being connected with the said tank, as set forth.

8. A compressed-air supply for electric cars having an air-reservoir, an air-compressor connected with the air-reservoir, a fluid-controlled means connected with the air-reservoir for throwing the compressor in and out of action, and means whereby the fluid-controlled means will be operated to throw the compressor into action, when the power is shut off from the motor of the car.

9. A compressed-air supply for electric cars, having an air-reservoir, an air-compressor connected with the air-reservoir, means for operating the compressor from a movable part of the car, a fluid-controlled means connected with the air-reservoir, for throwing the operating means in and out of operative position, and means whereby the fluid-controlled means will be operated to throw the driving means in operative position when the power is shut off from the motor of the car.

10. A compressed-air supply for electric cars, having an air-reservoir, an air-compressor connected with the air-reservoir, means for operating the compressor from a movable part of the car, a fluid-controlled means having connection with the air-reservoir for throwing the operating means in and out of operative position, a valve in the said connection, and means for operating the valve when the power is shut off from the motor of the cars, as and for the purpose set forth.

In testimony whereof we have signed our names to this specification in the presence of two subscribing witnesses.

ROLAND LE BARON OWEN.
  ROBERT OWEN LE BARON.

Witnesses:
 R. LE BARON,
 GEO. H. DRAKE.